Oct. 23, 1962  J. S. NOWAK ETAL  3,060,273
STANDBY TRANSFER CONTROL CIRCUITRY
Filed Nov. 25, 1959  6 Sheets-Sheet 2

INVENTORS J. S. NOWAK
W. ULRICH
BY Kenneth B. Hamlin
ATTORNEY

FIG. 8
NORMAL-NO TROUBLE

FIG. 10
DOUBLE BGS FAILURE: BGS A & C BAD

FIG. 7
LAYOUT OF A BGS STORAGE AREA

FIG. 9
SINGLE BGS FAILURE: BGS A BAD

United States Patent Office 3,060,273
Patented Oct. 23, 1962

3,060,273
STANDBY TRANSFER CONTROL CIRCUITRY
John S. Nowak, Clifton, N.J., and Werner Ulrich, New York, N.Y., assignors to Bell Telephone Laboratories, Incorporated, New York, N.Y., a corporation of New York
Filed Nov. 25, 1959, Ser. No. 855,446
13 Claims. (Cl. 179—27)

This invention relates in general to telephone switching systems and particularly to arrangements for improving the reliability of such systems.

In recent years there has been a trend away from electromechanical switching systems which employ large numbers of slow speed unifunctional devices to Common Control switching systems wherein there are varying degrees of functional concentration. Certain present-day telephone switching systems such as the well-known crossbar switching system disclosed in the A. J. Busch Patent 2,585,904, which issued February 19, 1952, show arrangements wherein certain Common Control equipment is time shared by a large number of subscribers and trunks. In the system of the copending application of A. H. Budlong, G. G. Drew, and J. A. Harr, Serial No. 688,386, filed October 7, 1957, which is now Patent 2,955,165, issued October 4, 1960, there is shown an even greater concentration of function in the Common Control equipment.

Where there is a high concentration of function in common equipment, system operation depends upon 100 percent reliability of operation in the common equipment. As in any man-made device, there is the ever-present possibility of failure, and as is well known in the telephone art, routine preventive maintenance testing of equipment can be employed to advantage to avoid costly failures.

Certain prior art telephone switching systems employ a limited duplication of equipment in which standby devices are automatically or manually placed in service in the event of failure. In prior art slow speed systems, speed of detection of fault, speed of transfer, continuity of operation, et cetera, have not been of particular importance; however, where there is a high degree of functional concentration, speed of transfer and continuity of service are of paramount importance if customer service is to be maintained.

In the above-noted switching system of Budlong-Drew-Harr, high speed multifunctional Common Control circuits are featured. The Common Control apparatus includes a high capacity permanent store wherein orders for the synthesis of system logic are stored and a Temporary Memory wherein call progress information and system administration information are recorded. The Common Control operates on a digital basis.

In prior art digital systems, transient errors are detected in a plurality of ways including the use of parity checking code elements and through the use of redundant codes. Once an error has been detected, the source thereof must be determined and immediate action undertaken to eliminate the source.

Accordingly, it is an object of this invention to improve the reliability of electronic telephone switching systems.

It is another object of this invention to insure continuity of service in electronic telephone switching systems.

These and other objects of this invention are achieved in one specific illustrative embodiment wherein careful surveillance of system operation is maintained by a system of wired or programmed matches of present signals with anticipated signals. Once an imperfection in system operation is thus detected, a fault-checking routine comprising programmed logical steps to pinpoint the source of error is undertaken and having thus located the source of trouble, the faulty apparatus is automatically removed from service and action is taken to maintain a duplicate record of priority information in the Temporary Memory at the expense of loss of duplication of non-priority information.

In transferring to standby apparatus, care is taken to insure continuity of service; therefore, the transfer is effected in precisely defined steps. In the case of failure in a portion of the Temporary Memory, measures are taken to preserve information essential to system operation. In normal system operation, wherein the Temporary Memory is operating without fault, the two classes of information stored in the Temporary Memory, namely, call progress information and system administration information, are duplicated and stored in regular and standby units; however, upon the occurrence of failure in one or more units of the Temporary Memory, there is insufficient remaining storage capacity in the system to duplicate both classes of information. The system administration information is of relatively greater importance than the call progress information; therefore, in accordance with this invention, whenever necessary, system administration information is duplicated even at the expense of loss of duplicate call progress information.

Standby units of equipment are identical to the regular units and are therefore also subject to failure. Accordingly, the system must be able to detect failures in the standby units as well as in the working units.

In accordance with one feature of this invention, a comparison or a match is made between information obtained from one source and the anticipated output from that source. A failure to match is indicative of an error.

In accordance with still another feature of this invention, a priority is assigned to one class of information stored in the Temporary Memory and in the event of loss of storage capacity in the Temporary Memory the priority information is retained even at the expense of loss of duplication of non-priority information.

In accordance with another feature of this invention, transfer from regular to standby equipment is accomplished in a prescribed sequence to avoid loss of information and system errors.

The above and other objects and features of this invention can best be understood by reference to the drawings, in which.

GENERAL DESCRIPTION

Figures 1, 2:
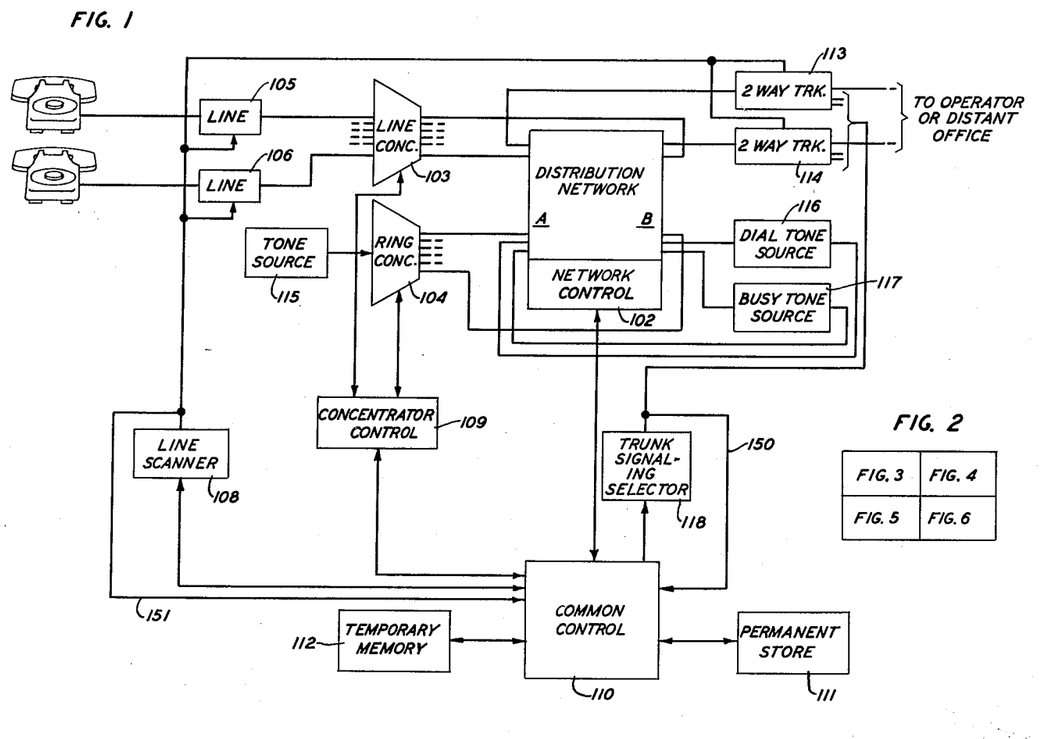
FIG. 1 is a block diagram representation of an electronic switching system in accordance with this invention.
FIG. 2 is a key diagram showing the arrangement of FIGS. 3 through 6.

FIG. 1 is a block diagram representation of the electronic switching system disclosed in the copending application of W. A. Budlong, G. G. Drew, and J. A. Harr, Serial No. 688,386, which is now Patent 2,955,165, issued October 4, 1960, as modified by this invention.

The Common Control 110 is a flexible universal information processing center which, in accordance with the orders from the Permanent Store 111, serves to process on a time division basis, all of the actions necessary to the handling of telephone switching traffic, including the analysis of troubles within the system and the remedial actions attendant any system troubles. In accordance with this invention, as will be more fully explained later, Common Control 110, under the influence of orders from the Permanent Store 111 and information from the Temporary Memory 112, recognizes faults in the Temporary Memory 112 and takes appropriate action with respect to the Temporary Memory in response thereto.

The Permanent Store 111 is a random access nondestructive readout permanent memory. Multiple bit order words which dictate the work operation to be performed are read from the Permanent Store into the Common Control 110. The order words comprise the address of scenes of action in the switching system as well as commands to be undertaken. The system logic, therefore, is primarily in the form of order words in the Permanent Store 111.

In addition to program information, other information of a substantially unchanging nature is also stored in the Permanent Store 111. Subscriber directory number to equipment number translations are representative of this latter type of information.

The Temporary Memory 112 is, in this one illustrative embodiment, a barrier grid store wherein two classes of information are stored. The first class of information relates to the status of subscribers' lines and the progress of calls through the system and the other class comprises system administration information. For example, current directory number to equipment number translations are maintained in the Temporary Store until changes are affected in the Permanent Store and records as to the condition of the system are also maintained in the Temporary Memory. These are both examples of system administration information.

Figure 7:
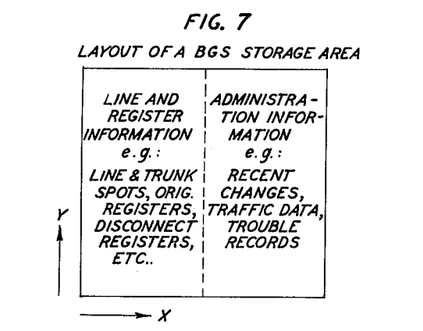
FIG. 7 shows the assignment of storage area in the Temporary Memory.
Figure 8:
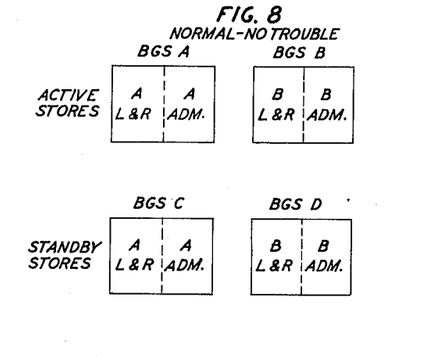
FIG. 8 shows the arrangement of information in the regular and standby units of the Temporary Memory during normal operation.

The two classes of information are arranged in the barrier grid store as shown in FIGS. 7 and 8. In this one illustrative example, four separate barrier grid tubes are employed. In the absence of trouble, call progress information, such as line and trunk activity spots, originating registers, disconnect registers, et cetera, is located in the left side of each tube and system administration information such as recent change registers, traffic data, trouble records, et cetera, is located in the right side of each tube as shown in FIG. 7. As shown in FIG. 8, in the normal no-trouble mode of operation, barrier grid tubes A and B are employed as active memories from which the Common Control 110 receives information and barrier grid tubes C and D are standby memories which are employed in conjunction with the active memories to detect trouble. Once a trouble in one of the four barrier grid store tubes has been indicated, steps must be taken to rearrange the information in the remaining usable tubes so as to maintain a complete, accurate system record. This process will be later described.

The Common Control 110, as previously noted, is an information processing center acting under orders from the Permanent Store 111. The Common Control is a high-speed device performing a new order operation approximately each 2½ microseconds. The allocation of time to the various system functions is dictated by a main program in the Permanent Store 111 which is calculated to insure that all subscribers and trunks of the switching system and other necessary work operations of the system are adequately served.

The signals from the Common Control 110 to the Temporary Memory 112 comprise an address and an order. The address positions the beam of the barrier grid tube and the order indicates the action to be taken at the addressed storage spot. Since the information in the barrier grid tube is destroyed when read out, an order must indicate whether the spot read should be regenerated or changed. In response to the commands, the Temporary Store indicates to Common Control the state of the addressed storage spot.

The Common Control, in accordance with the program in the Permanent Store 111, also passes information in the form of addresses and commands to the Line Scanner 108, the Concentrator Controller 109, the Distribution Network Control 102, and the Trunk Signaling Selector 118.

The Line Scanner 108 receives an address from Common Control and interrogates line and trunk circuits represented by 105, 106, 113, and 114 to determine the supervisory state of the line or trunk. In addition, in accordance with one aspect of this invention, a variety of electrical points in the Common Control 110 are scanned from time to time to detect defects in system operation. In FIG. 1, such scanning of points internal to the Common Control 110 is via the conductor group 151.

Connections through the Distribution Network 102 are accomplished in accordance with information passed between the Common Control 110 and the Distribution Network Control 102. Common Control 110 transmits to the network control the address of lines or trunks to be acted upon and commands which indicate whether the line is to be connected or released.

The Trunk Signaling Selector 118 is employed to control the loop conditions on trunks such as 113 and 114 and to establish desired binary conditions within the Common Control 110. The Trunk Signaling Selector 118 receives a message from Common Control 110 which is a combined address and command. The address identifies the particular trunks such as 113 or 114 or the particular element in Common Control 110 which is to be controlled. The command indicates the supervisory state that the trunk is to assume or the binary state that the controlled element is to assume. Common Control 110 receives commands from the Trunk Signaling Selector over conductor group 150.

The Line Concentrator 103 and the Ringing Concentrator 104 are under control of the Concentrator Controller 109. The Line Concentrator 103 provides the necessary transmission paths between the subscribers' lines such as 105 and 106 and the Distribution Network 102, while the Ringing Concentrator 104 provides the necessary transmission paths between the tone source 115 and the Distribution Network 102. As in the case of the Network Control, the concentrator control 109 receives commands from the Common Control 110, responds to such commands and indicates to Common Control 110 the completion of an assigned task.

This invention is directed particularly to the detection of troubles in the Temporary Memory 112, to the rearrangement of information in the storage elements of the Temporary Memory 112 upon detection of a trouble, and to the control of the storage elements in the Temporary Memory, both in the absence and presence of trouble therein.

DETAILED DESCRIPTION

The following is a detailed discussion of the functions of the arrangements of FIGS. 3 through 6. The circuitry shown in FIGS. 3 through 6 includes but a small portion of the Common Control 110. The subject discussion is limited to the work operations necessary to accomplish the desired results and the particular program orders are not indicated. The program orders employed in such an electrical switching system are described in the above-noted copending Budlong-Drew-Harr application. In the above-noted copending application the Temporary Memory comprises only one barrier grid store tube, while in the subject arrangements, four such tubes are employed. Accordingly, additional program words are required to define the particular barrier grid store tube which is to be employed and additional program sequences are required to pinpoint faults within these tubes and to rearrange information therein. These program orders will not be dicussed in detail herein, but rather the discussion will be limited to a showing of the sequences of work operations required to accomplish the desired results.

Figure 4:
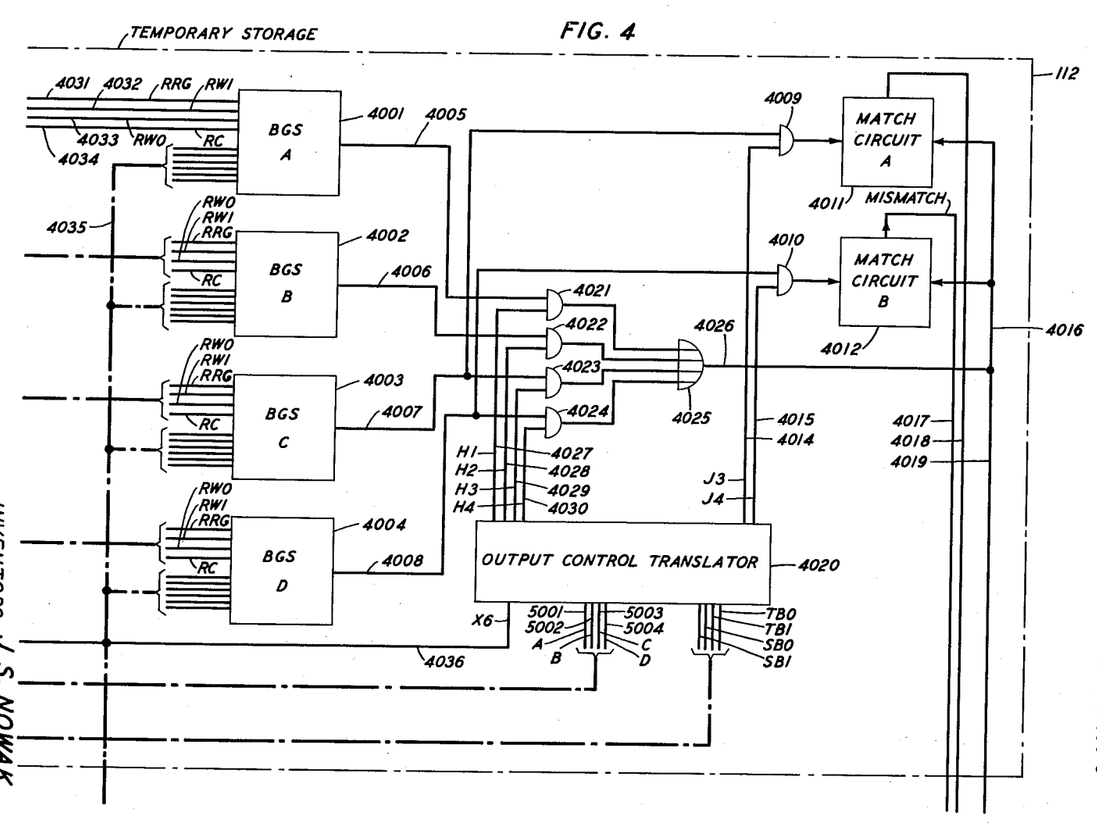

In FIG. 4 there are shown four barrier grid store tubes, namely, BGS–A through BGS–D, which are labeled 4001 through 4004 respectively. To avoid a cluttering of the drawings, single lines are often employed to denote more than one conductor. Where this situation obtains, the line in the drawing will be referred to as a pair or as a conductor group, whichever the case may be. For example, in FIG. 4 the lines labeled 4005, 4006, 4007 and 4008, each represent a pair of conductors. That is, the output from each barrier grid store, such as 4001, is on a two-rail basis. One conductor of each pair when energized, indicates a "1" output signal and the other conductor of the pair when energized indicates a "0" output signal. This concept is carried further and each of the gates 4021 through 4024, 4009, 4010 and 4025, in fact, represents a pair of gates.

In each of the barrier grid stores 4001 through 4004, there are individual address registers which are set in accordance with address information on cable 4035.

The A Match Circuit 4001 and the B Match Circuit 4002 are each arranged to compare the outputs of two binary devices which are connected to the Match Circuit on a two-rail basis. Each of the Match Circuits 4011 and 4012 is arranged to provide a mismatch signal whenever opposite binary conductors of the two binary devices connected thereto are energized. In the absence of a signal on the conductors of one or both of the binary devices, the mismatch signal is not generated.

Figure 6:
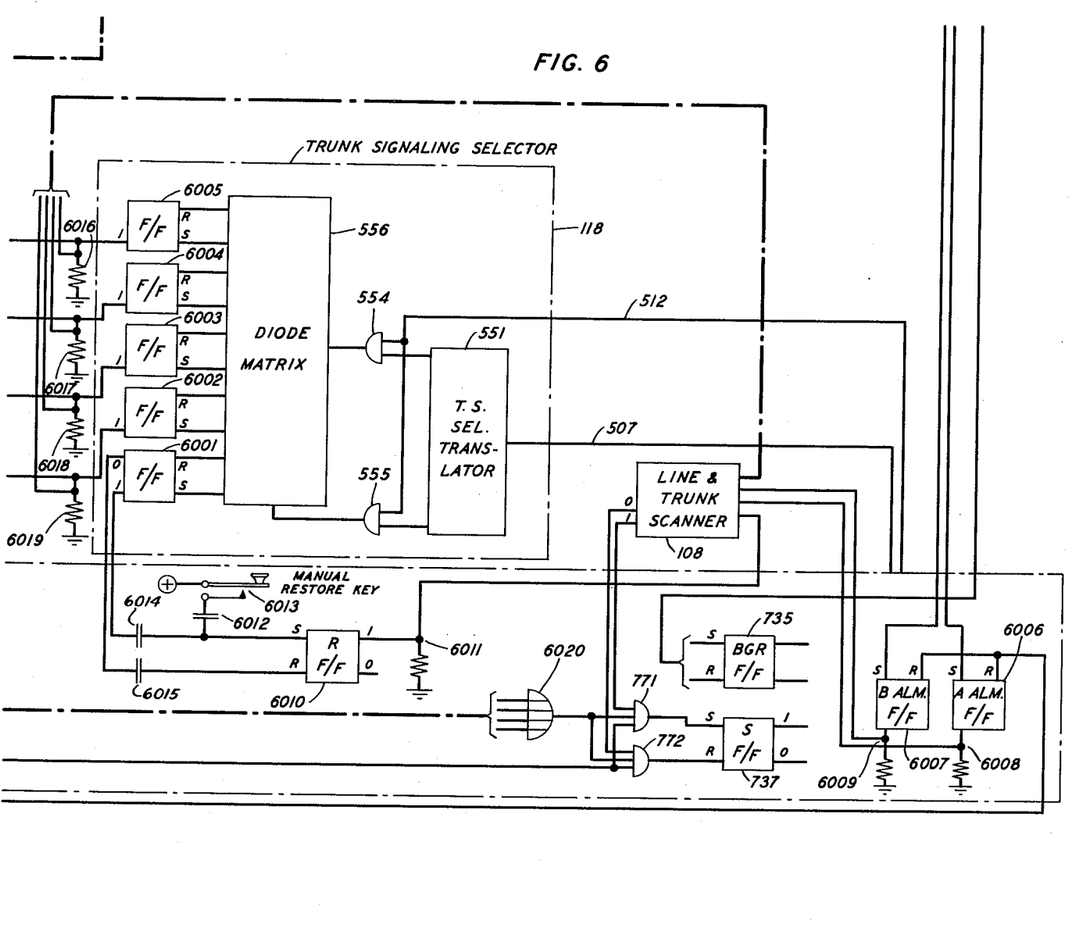

The output conductor pairs 4005 through 4008 of the barrier grid tubes 4001 through 4004 are selectively connected to the A and B Match Circuits and to the BGR flip-flop 735 in FIG. 6. These connections are in accordance with the gating signals on conductors H1 through H4 which are labeled 4027 through 4030 respectively, and the J3 and J4 conductors which are labeled 4014 and 4015 respectively. For example, when the input conditions to the Output Control Translator 4020 are appropriate to energize the H1 conductor, AND gate 4021 will be enabled. The output from the barrier grid store A tube 4001 then will be connected through OR gate 4025 and conductor pair 4026 to the right sides of the A Match Circuit 4011 and the B match Circuit 4012 and to the input terminals of the BGR flip-flop 735 via conductor pair 4019.

The Output Control Translator 4020 is not shown in circuit detail, but rather its function is defined by the following table of Boolean equations:

*Output Control Translator*

Figure 5:
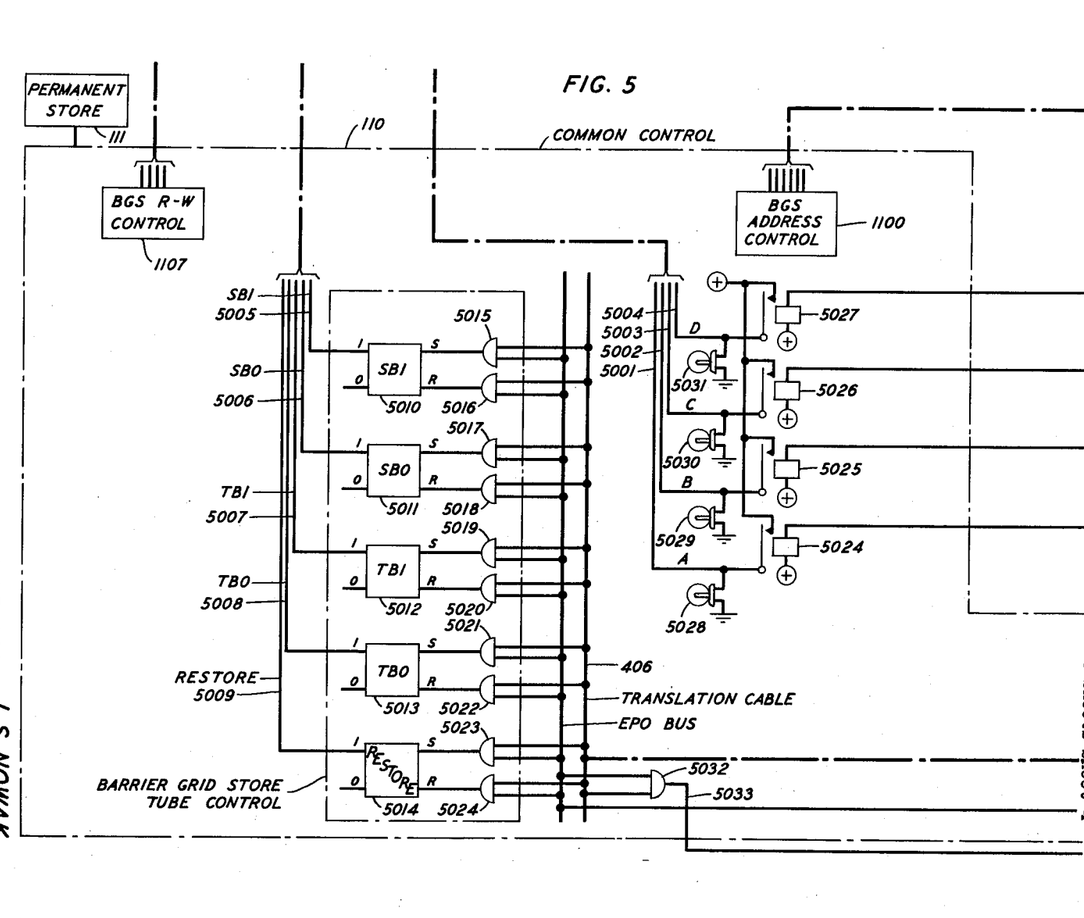
FIGS. 5 and 6 are block diagrams of a portion of the Common Control and the Trunk Signaling Selector of FIG. 1 in accordance with this specific embodiment.

(1) $A' \cdot B' \cdot C' \cdot D' \cdot TB0 \cdot (X_6 + X_6') = H1 \cdot J3$
(2) $A' \cdot B' \cdot C' \cdot D' \cdot TB1 \cdot (X_6 + X_6') = H2 \cdot J4$
(3) $A' \cdot B' \cdot C' \cdot D' \cdot SB0 \cdot (X_6 + X_6') = H3$
(4) $A' \cdot B' \cdot C' \cdot D' \cdot SB1 \cdot (X_6 + X_6') = H4$
(5) $A \cdot B' \cdot C' \cdot D' \cdot TB0 \cdot (X_6 + X_6') = H3$
(6) $A \cdot B' \cdot C' \cdot D' \cdot TB1 \cdot X_6 = H2 \cdot J4$
(7) $A \cdot B' \cdot C' \cdot D' \cdot TB1 \cdot X_6' = H2$
(8) $A \cdot B' \cdot C' \cdot D' \cdot SB0 \cdot (X_6 + X_6') = H1$
(9) $A \cdot B' \cdot C' \cdot D' \cdot SB1 \cdot (X_6 + X_6') = H4$
(10) $A' \cdot B \cdot C' \cdot D' \cdot TB0 \cdot (X_6 + X_6') = H1$
(11) $A' \cdot B \cdot C' \cdot D' \cdot TB1 \cdot X_6' = H4$
(12) $A' \cdot B \cdot C' \cdot D' \cdot TB1 \cdot X_6' = H4 \cdot J3$
(13) $A' \cdot B \cdot C' \cdot D' \cdot SB0 \cdot (X_6 + X_6') = H3$
(14) $A' \cdot B \cdot C' \cdot D' \cdot SB1 \cdot (X_6 + X_6') = H2$
(15) $A' \cdot B' \cdot C \cdot D' \cdot TB0 \cdot (X_6 + X_6') = H1$
(16) $A' \cdot B' \cdot C \cdot D' \cdot TB1 \cdot X_6' = H2$
(17) $A' \cdot B' \cdot C \cdot D' \cdot TB1 \cdot X_6' = H2 \cdot J4$
(18) $A' \cdot B' \cdot C \cdot D' \cdot SB0 \cdot (X_6 + X_6') = H3$
(19) $A' \cdot B' \cdot C \cdot D' \cdot SB1 \cdot (X_6 + X_6') = H4$
(20) $A' \cdot B' \cdot C' \cdot D \cdot TB0 \cdot (X_6 + X_6') = H1$
(21) $A' \cdot B' \cdot C' \cdot D \cdot TB1 \cdot X_6' = H2$
(22) $A' \cdot B' \cdot C' \cdot D \cdot TB1 \cdot X_6 = H2 \cdot J3$
(23) $A' \cdot B' \cdot C' \cdot D \cdot SB0 \cdot (X_6 + X_6') = H3$
(24) $A' \cdot B' \cdot C' \cdot D \cdot SB1 \cdot (X_6 + X_6') = H4$
(25) $A \cdot B \cdot C' \cdot D' \cdot TB0 \cdot (X_6 + X_6') = H3$
(26) $A \cdot B \cdot C' \cdot D' \cdot TB1 \cdot (X_6 + X_6') = H4$
(27) $A \cdot B \cdot C' \cdot D' \cdot SB0 \cdot (X_6 + X_6') = H1$
(28) $A \cdot B \cdot C' \cdot D' \cdot SB1 \cdot (X_6 + X_6') = H2$
(29) $A \cdot B' \cdot C \cdot D' \cdot TB0 \cdot (X_6 + X_6') = H4$
(30) $A \cdot B' \cdot C \cdot D' \cdot TB1 \cdot (X_6 + X_6') = H2$
(31) $A \cdot B' \cdot C \cdot D' \cdot SB0 \cdot (X_6 + X_6') = H3$
(32) $A \cdot B' \cdot C \cdot D' \cdot SB1 \cdot (X_6 + X_6) = H1$
(33) $A \cdot B' \cdot C' \cdot D \cdot TB0 \cdot (X_6 + X_6') = H3$
(34) $A \cdot B' \cdot C' \cdot D \cdot TB1 \cdot (X_6 + X_6') = H2$
(35) $A \cdot B' \cdot C' \cdot D \cdot SB0 \cdot (X_6 + X_6') = H1$
(36) $A \cdot B' \cdot C' \cdot D \cdot SB1 \cdot (X_6 + X_6') = H4$
(37) $A' \cdot B \cdot C \cdot D' \cdot TB0 \cdot (X_6 + X_6') = H1$
(38) $A' \cdot B \cdot C \cdot D' \cdot TB1 \cdot (X_6 + X_6') = H4$
(39) $A' \cdot B \cdot C \cdot D' \cdot SB0 \cdot (X_6 + X_6') = H3$
(40) $A' \cdot B \cdot C \cdot D' \cdot SB1 \cdot (X_6 + X_6') = H2$
(41) $A' \cdot B \cdot C' \cdot D \cdot TB0 \cdot (X_6 + X_6') = H1$
(42) $A' \cdot B \cdot C' \cdot D \cdot TB1 \cdot (X_6 + X_6') = H3$
(43) $A' \cdot B \cdot C' \cdot D \cdot SB0 \cdot (X_6 + X_6') = H2$
(44) $A' \cdot B \cdot C' \cdot D \cdot SB1 \cdot (X_6 + X_6') = H4$
(45) $A' \cdot B' \cdot C \cdot D \cdot TB0 \cdot (X_6 + X_6') = H1$
(46) $A' \cdot B' \cdot C \cdot D \cdot TB1 \cdot (X_6 + X_6') = H2$
(47) $A' \cdot B' \cdot C \cdot D \cdot SB0 \cdot (X_6 + X_6') = H3$
(48) $A' \cdot B' \cdot C \cdot D \cdot SB1 \cdot (X_6 + X_6') = H4$ Input signals from the Common Control 110 to the Temporary Memory 112 comprise horizontal and vertical addresses to be assumed by the barrier grid tube beam and commands to be performed at the addressed storage area. The four barrier grid tubes 4001 through 4004 are simultaneously addressed in parallel over cable 4035. The action to be taken in any one of these four tubes, however, is under control of the respective barrier grid store control input gates 3002 through 3005. There are four input gates associated with each barrier grid tube. These are, namely, the Read and Regenerate Gate 3010, Read and Write "1" Gate 3011, the Read and Write "0" Gate 3012, and the Read and Change Gate 3013. The barrier grid store control input gates shown in FIG. 3 of this application find no counterpart in the copending Budlong et al. application as these are required only where more than one tube is employed. The particular order to be executed is indicated by signals from the barrier grid store Read-Write Control 1107 which is shown in FIG. 5 of this application.

The details of the barrier grid store Read-Write Control 1107 are shown in FIG. 11 of the copending Budlong et al. application. The Read-Write Control 1107 generates commands to the input control gates 3002 through 3005 in accordance with program orders from the Permanent Store 111.

Figure 3:
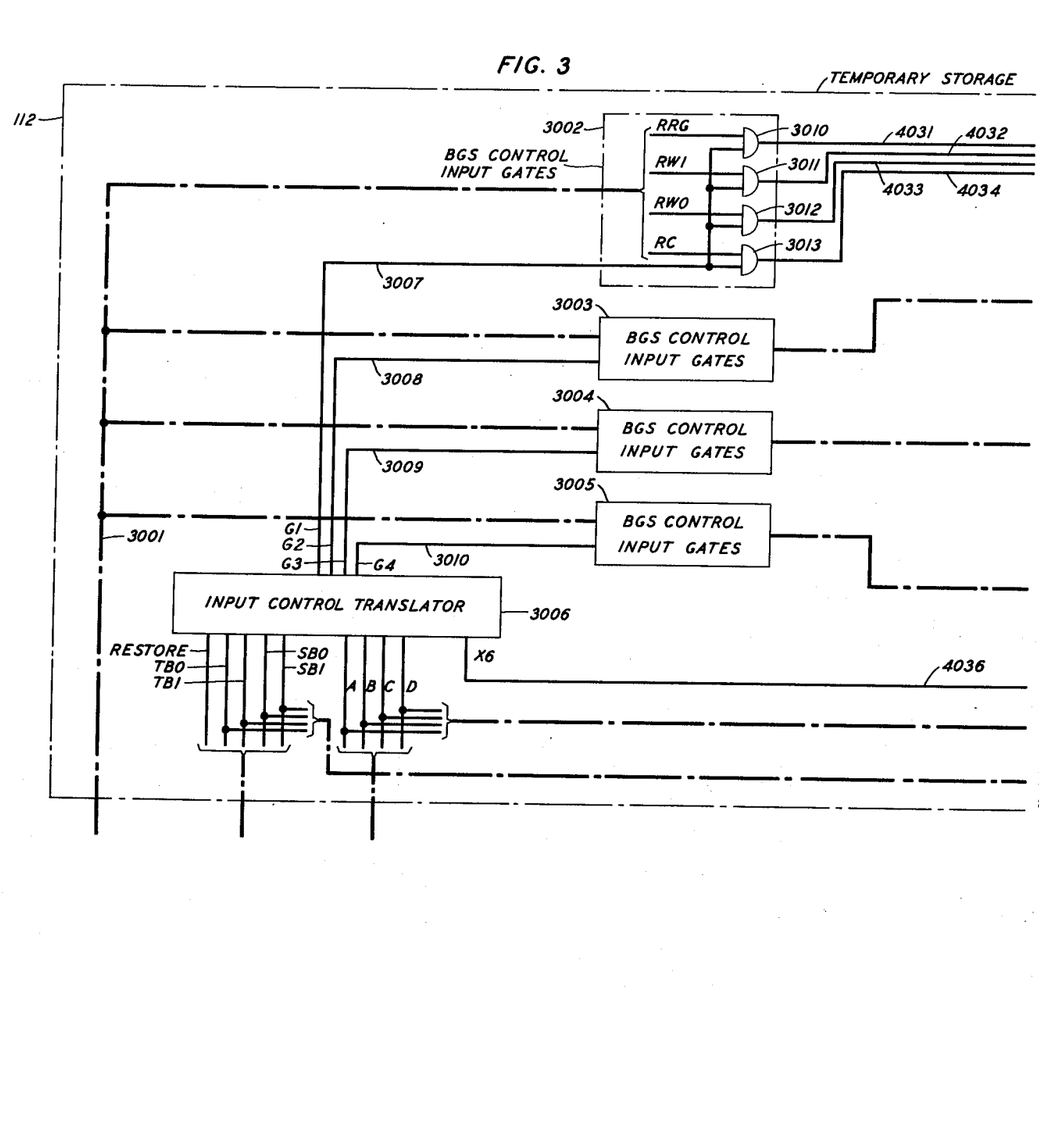
FIGS. 3 and 4 are block diagrams which show the arrangement of circuit elements in the Temporary Memory of FIG. 1 in accordance with a specific embodiment of our invention.

The particular tube or tubes which are to respond to a control signal from the barrier grid store Read-Write Control are determined by the input conditions to the Input Control Translator 3006, which again finds no counterpart in the Budlong et al. application. The Input Control Translator 3006, in response to later described input signals, energizes the G1 through G4 conductors which are labeled 3007 through 3010, respectively. These gating conductors may be energized individually or in pairs. The tube or tubes to be energized are determined by a designation of the information to be obtained from the Temporary Memory, and by the trouble status of the Temporary Memory. In the normal no-trouble mode of operation, information in the Temporary Memory is arranged as shown in FIGS. 7 and 8. It should be noted at this point that the arrangement of information as shown in FIG. 7 differs from that shown in FIG. 17 of the copending Budlong et al, application. The exact layout of information in the Temporary Memory is a matter of the designers' choice and the arrangements shown in this application are by way of illustration only.

The program orders which originate in the Permanent Store must designate the information to be obtained from the Temporary Memory. It is not sufficient to merely designate an address within a tube, but also the particular tube must be indicated.

In FIG. 5, there is shown a Translation Cable 406 which is shown throughout the drawing of the above-noted Budlong et al. application. This is the output cable from the Order Translator 410 of the Budlong et al. application. The Translation Cable comprises a plurality of wires which are selectively energized in accordance with the order word which has been read from the Permanent Store. In FIG. 5 there are shown ten AND gates labeled 5015 through 5024. Each of these AND gates has an input conductor from the Translation Cable 406 and each receives a gating or clock signal from the Execute Present Order bus which is labeled EPO. In the normal no-trouble mode of operation, an order which seeks call progress or administrative information regarding the A group of lines effects enablement of AND gate 5021 and the attendant setting of the TB0 flip-flop 5013. Similarly, an order which seeks either call progress or administrative information relating to the B group of lines effects enablement of the AND gate 5019 and the attendant setting of the TB1 flip-flop 5012. In the normal no-trouble mode of operation, the standby information for the A group of lines is contained in barrier gird store tube C. An order which is designed to obtain only information concerning the A group of lines from the standby tube effects enablement of AND gate 5017 and the setting of the SB0 flip-flop 5011. Similarly, standby information relating to the B group of lines is obtained by enablement of AND gate 5015 and the setting of the SB1 flip-flop 5010.

The restore flip-flop 5014 is energized during a sequence of orders which are arranged to change the temporary store from a trouble mode to a no-trouble mode. The operation of the restore flip-flop 5014 and its function will be later described.

In FIG. 5, there are shown four Trouble Relays 5024 through 5027. The energization of one of these relays indicates that the barrier grid store tube to which the relay is assigned is in trouble. The manner in which these relays are energized will be described with respect to FIG. 6. Each of the relays 5024 through 5027 is arranged to place a significant potential on its associated output conductor 5001 through 5004, respectively, and to energize the associated one of the lamps 5028 through 5031 whenever a relay is operated. As in the case of the TB0, TB1, SB0, and SB1 conductors, the output conductors 5001 through 5004 provide input signals to both the Input Control Translator 3006 and the Output Control Translator 4020.

In the case of trouble in one or more of the Temporary Memory tubes, the particular tube to be operated and the information signals to be obtained from the tubes is in part dependent upon whether information is being obtained from the left or right side of the tube. Assuming a 6-bit horizontal address, the state of the sixth or most significant bit of the barrier grid store tube address will determine whether the left or right side of the tube is being addressed. Accordingly, the conductor carrying the binary information as to the status of the sixth bit, commonly referred to herein as the $X_6$ bit, is employed as an input signal to both the Input Control Translator 3006 and the Output Control Translator 4020. This signal is carried on conductor 4036.

The Input Control Translator is not shown in detail in FIG. 3; however, its operation is defined, except for the operation of the restore function, by the following table of Boolean equations:

*Input Control Translator*

(1) $A' \cdot B' \cdot C' \cdot D' \cdot TB0 \cdot (X_6 + X_6') = G1 \cdot G3$
(2) $A' \cdot B' \cdot C' \cdot D' \cdot TB1 \cdot (X_6 + X_6') = G2 \cdot G4$
(3) $A' \cdot B' \cdot C' \cdot D' \cdot SB0 \cdot (X_6 + X_6') = G3$
(4) $A' \cdot B' \cdot C' \cdot D' \cdot SB1 \cdot (X_6 + X_6') = G4$
(5) $A \cdot B' \cdot C' \cdot D' \cdot TB0 \cdot (X_6 + X_6') = G3$
(6) $A \cdot B' \cdot C' \cdot D' \cdot TB1 \cdot X_6 = G2 \cdot G4$
(7) $A \cdot B' \cdot C' \cdot D' \cdot TB1 \cdot X_6' = G2$
(8) $A \cdot B' \cdot C' \cdot D' \cdot SB0 \cdot (X_6 + X_6') = G1$
(9) $A \cdot B' \cdot C' \cdot D' \cdot SB1 (X_6 + X_6') = G4$
(10) $A' \cdot B \cdot C' \cdot D' \cdot TB0 \cdot (X_6 + X_6') = G1$
(11) $A' \cdot B \cdot C' \cdot D' \cdot TB1 \cdot X_6 = G2 \cdot G4$
(12) $A' \cdot B \cdot C' \cdot D' \cdot TB1 \cdot X_6' = G4$
(13) $A' \cdot B \cdot C' \cdot D' \cdot SB0 \cdot (X_6 + X_6') = G3$
(14) $A' \cdot B \cdot C' \cdot D' \cdot SB1 \cdot (X_6 + X_6') = G2$
(15) $A' \cdot B' \cdot C \cdot D' \cdot TB0 \cdot (X_6 + X_6') = G1$
(16) $A' \cdot B' \cdot C \cdot D' \cdot TB1 \cdot X_6 = G2 \cdot G4$
(17) $A' \cdot B' \cdot C \cdot D' \cdot TB1 \cdot X_6' = G2$
(18) $A' \cdot B' \cdot C \cdot D' \cdot SB0 \cdot (X_6 + X_6') = G3$
(19) $A' \cdot B' \cdot C \cdot D' \cdot SB1 \cdot (X_6 + X_6') = G4$
(20) $A' \cdot B' \cdot C' \cdot D \cdot TB0 \cdot (X_6 + X_6') = G1$
(21) $A' \cdot B' \cdot C' \cdot D \cdot TB1 \cdot X_6' = G2$
(22) $A' \cdot B' \cdot C' \cdot D \cdot TB1 \cdot X_6 = G2 \cdot G3$
(23) $A' \cdot B' \cdot C' \cdot D \cdot SB0 \cdot (X_6 + X_6') = G3$
(24) $A' \cdot B' \cdot C' \cdot D \cdot SB1 \cdot (X_6 + X_6') = G4$
(25) $A \cdot B \cdot C' \cdot D' \cdot TB0 \cdot (X_6 + X_6') = G3$
(26) $A \cdot B \cdot C' \cdot D' \cdot TB1 \cdot (X_6 + X_6') = G4$
(27) $A \cdot B \cdot C' \cdot D' \cdot SB0 \cdot (X_6 + X_6') = G1$
(28) $A \cdot B \cdot C' \cdot D' \cdot SB1 \cdot (X_6 + X_6') = G2$
(29) $A \cdot B' \cdot C \cdot D' \cdot TB0 \cdot (X_6 + X_6') = G4$
(30) $A \cdot B' \cdot C \cdot D' \cdot TB1 \cdot (X_6 + X_6') = G2$
(31) $A \cdot B' \cdot C \cdot D' \cdot SB0 \cdot (X_6 + X_6') = G3$
(32) $A \cdot B' \cdot C \cdot D' \cdot SB1 \cdot (X_6 + X_6') = G1$
(33) $A \cdot B' \cdot C' \cdot D \cdot TB0 \cdot (X_6 + X_6') + G3$
(34) $A \cdot B' \cdot C' \cdot D \cdot TB1 \cdot (X_6 + X_6') = G2$
(35) $A \cdot B' \cdot C' \cdot D \cdot SB0 \cdot (X_6 + X_6') = G1$
(36) $A \cdot B' \cdot C' \cdot D \cdot SB1 \cdot (X_6 + X_6') = G4$
(37) $A' \cdot B \cdot C \cdot D' \cdot TB0 \cdot (X_6 + X_6') = G1$
(38) $A' \cdot B \cdot C \cdot D' \cdot TB1 \cdot (X_6 + X_6') = G4$
(39) $A' \cdot B \cdot C \cdot D' \cdot SB0 \cdot (X_6 + X_6') = G3$
(40) $A' \cdot B \cdot C \cdot D' \cdot SB1 \cdot (X_6 + X_6') = G2$
(41) $A' \cdot B \cdot C' \cdot D \cdot TB0 \cdot (X_6 + X_6') = G1$
(42) $A' \cdot B \cdot C' \cdot D \cdot TB1 \cdot (X_6 + X_6') = G3$
(43) $A' \cdot B \cdot C' \cdot D \cdot SB0 \cdot (X_6 + X_6') = G2$
(44) $A' \cdot B \cdot C' \cdot D \cdot SB1 \cdot (X_6 + X_6') = G4$
(45) $A' \cdot B' \cdot C \cdot D \cdot TB0 \cdot (X_6 + X_6') = G1$
(46) $A' \cdot B' \cdot C \cdot D \cdot TB1 \cdot (X_6 + X_6') = G2$
(47) $A' \cdot B' \cdot C \cdot D \cdot SB0 \cdot (X_6 + X_6') = G3$
(48) $A' \cdot B' \cdot C \cdot D \cdot SB1 \cdot (X_6 + X_6') = G4$ Energization of the restore conductor 5009 serves to negate the function of the Trouble Relays 5024 through 5027 with respect to the Input Control Translator 3006 but does not affect the Output Control Translator 4020. In returning from a trouble mode to a no-trouble mode of operation, the location of the information to be obtained is a function of the trouble status; however, in writing this information back into the appropriate location in the memory, the trouble status is disregarded as the information is being placed in the areas prescribed by the no-trouble mode of operation.

The A and B Match Circuits 4011 and 4012 have heretofore been discussed and it has been stated that a mismatch signal will be generated by the Match Circuit 4011 or 4012 whenever dissimilar information is presented to the left and right input terminals thereof. In the absence of a mismatch signal, the A alarm flip-flop 6006 and the B alarm flip-flop 6007, both seen in FIG. 6, will be in the reset state; however, upon a mismatch signal from either of the Match Circuits 4011 or 4012, the associated alarm flip-flop 6006 or 6007, respectively, will be enabled. In the normal sequence of events, orders from the Permanent Store 111 direct the attention of the Line and Trunk Scanner 108 to the scan points 6008 and 6009 which are associated with the A and B alarm flip-flop 6006 and 6007. Upon detection of an alarm condition as indicated by the setting of the A or B alarm flip-flop, a sequence of steps will be undertaken to pinpoint the source of trouble. This course of action will be later described in fuller detail.

Once a source of trouble has been located, steps are taken to energize the appropriate one of the Trouble Relays 5024 through 5027 and to reset the alarm flip-flops 6006 and 6007. The Trouble Relays are energized under control of the Trunk Signaling Selector 118.

The alarm flip-flops 6006 and 6007 are reset under control of the AND gate 5032. The AND gate 5032 is enabled under the influence of an order signal from the Translation Cable 406 and a clock signal from the EPO bus.

The Trunk Signaling Selector 118 responds to signals which are a combined address and command. The address defines the particular trunk or element to be controlled and the command indicates the binary state which the trunk or element is to assume. Associated with each address of the Trunk Signaling Selector, there is a flip-flop such as 6001 through 6005, which is set or reset in accordance with the command portion of the input signal. For example, if, after a sequence of orders, it is determined that the barrier grid store A tube is in trouble, then the flip-flop 6005 will be set and the A Trouble Relay 5024 will be energized.

Once it has been determined that the trouble has been cleared, the restore flip-flop 6010 is either automatically or manually set. As in the case of the scan points 6008 and 6009, the scan point 6011 is periodically scanned. When the restore flip-flop 6010 is thus found to be in the set state, the Common Control 110 will undertake a sequence of commands to rearrange the information in the various tubes to arrive at the no-trouble mode of operation. After the rearrangement of information has been completed, that is, once all of the information is back in the no-trouble mode, the Trunk Signaling Selector 118 will be addressed to reset the flip-flop 6005 and thereby reset the restore flip-flop 6010.

TROUBLE SEQUENCE

It is assumed as a starting point that the system is operating in the no-trouble mode; therefore, the alarm flip-flops 6006 and 6007 are both in the "0" state, the trouble flip-flops 6001 through 6005 in the Trunk Signaling Selector are all in the "0" state, the Trouble Relays 5024 through 5027 are de-energized, and the restore flip-flop 6010 is in the "0" state. For the purposes of this discussion, it is unimportant what specific program orders are being executed. However, it is assumed, only by way of example, that call progress information relating to the A group of lines is being requested. Under these conditions, the order on the Translation Cable 406 will be such as to effect, upon occurrence of an Execute Present Order pulse on the EPO bus, enablement of AND gate 5021 and the setting of the TB0 flip-flop 5013. The input conditions to both the Input and Output Control Translators are then fully established. In this illustrative example, only the TB0 input conductor is energized, Equation 1 of the table of equations for the Input Control Translator 3006 applies and both the G1 and G3 conductors 3007 and 3009 are energized. In that the four tubes 4001 through 4004 are addressed in parallel, identical information should appear at the output conductors 4005 and 4007 of the A and C tubes of the Temporary Memory when the G1 and G3 conductors are energized.

Equation 1 of the table of equations defining the Output Control Translator applies when only the TB0 conductor is energized. Under these conditions, the H1 and J3 conductors 4027 and 4014 are simultaneously energized. The H1 conductor serves to gate the output of the A barrier grid tube 4001 from conductor pair 4005 through AND gate 4021 and OR gate 4025 to the right side of both the A Match Circuit 4011 and the B Match Circuit 4012 as well as to the input terminals of the BGR flip-flop 735 via conductor pair 4019.

The J3 conductor enables AND gate 4009, thereby gating the output of the C barrier grid store tube 4003 on conductor pair 4007 to the left side of the A Match Circuit 4011. As previously explained, information to both the left and right sides of the Match Circuits is on a two-rail basis. That is, to the left side of the Match Circuit 4001, there are connected a "0" and a "1" conductor and to the right side of the Match Circuit 4001, there are connected a "0" and a "1" conductor. A mismatch signal on conductor 4018 is generated only when there is a dissimilarity of information on the two sides of the Match Circuit, for example, if the "1" conductor on the left side is enabled while the "0" conductor on the right side is enabled, a mismatch is indicated. Similarly, if a "1" signal appears at the left side of the Match Circuit, and a "0" signal at the right side, again, a mismatch signal will be generated. If the left and right input signals are identical, there is no mismatch signal, and further, if the input conductors from the left or right sides are not energized, there will be no mismatch signal. For example, if the output of A tube 4001 is gated through AND gate 4021 and OR gate 4025, to the right side of Match Circuit A, and there is no output gated to the left side of the Match Circuit 4011, there is no mismatch signal.

As long as identical information appears at the left and right sides of the A and B Match Circuits 4011 and 4012, the A and B alarm flip-flops 6006 and 6007 will remain in the reset condition. The first four equations of the tables of equations for both the Input and Output Control Translators 3006 and 4020 define system operation for the no-trouble mode. As seen by examination of Equations 1 through 4, whenever the program order requests call progress or administrative information from the working tube, a pair of tubes, namely, the working tube and its associated standby tube, will be energized. Further, as long as the no-trouble situation obtains, the output of the working tube, will be matched against the output of the standby tube. If information is requested of a standby tube, then the matching function is eliminated and the information derived is employed directly in Common Control 110. As seen from the tables of equations which define the Input and Output Translators 3006 and 4020, matching is possible in only a few instances in the presence of trouble. Accordingly, it is desirable to initiate a trouble sequence, determine the source of trouble, and take the necessary remedial action as early as possible. Once a trouble has been indicated, one of the alarm flip-flops 6006 or 6007 will be set. In the normal course of events, the Line and Trunk Scanner 108 is directed to scan points 6008 and 6009. As soon as one of the alarm flip-flops 6006 or 6007 is found to be in the "1" state, a trouble locating sequence is undertaken.

The trouble in any particular tube generally can be detected by one of the following three tests:

A. Check of the address registers;
B. Check of the tube's ability to execute the required commands at the desired address; and
C. A read-around test.

In that each of the four barrier grid stores 4001 through 4004 has individual address registers, a failure in one of these address registers can lead to a mismatch of output. The address registers are individually checked by the following sequence of operations:

Step 1—Write "1" in the memory at address $X=000000$ $-Y=000000$.
Step 2—Write "0" at address $X=100000-Y=000000$.
Step 3—Read memory at address $X=000000-Y$ $=000000$. If other than "1" is read, trouble is indicated in first stage of the X address register.

Step 4—If no trouble indicated under step 3, write "0" at address $X=010000-Y=000000$.

Step 5—Read at address 000000. If other than "1" is read, trouble is indicated in second stage of the X address register.

This procedure is followed until each of the six address registers has been set to the "1" state and a "0" written at the new address. This check is undertaken in each of the tubes which may be in trouble. For example, if upon matching the output of the first and third tubes, a trouble condition was indicated, then the address registers in the first and third tubes would be checked.

If the check of the address register does not indicate trouble therein, each of the suspected tubes is checked to assure its ability to execute the four commands. This can be accomplished by the following:

Step 1—Read and Write "1" at a test address.

Step 2—Read and Regenerate the store at the same test address. If other than a "1" is read from this address, trouble is indicated.

Step 3—If trouble is not indicated by the above steps, Read and Change the memory at the test address.

Step 4—Read and Regenerate the memory at the test address. If other than a "0" is read, trouble is indicated.

Step 5—Read and Write "0" at the test address.

Step 6—Read and Regenerate the memory at the test address. If other than a "0" is read, trouble is indicated.

If the above tests fail to pinpoint the source of trouble, a read-around test is then undertaken. As is well known, continued reading and writing in a barrier grid store affects, to a degree, storage areas which are not directly interrogated. Therefore, all of the storage areas are advantageously regenerated by program orders from time to time to prevent loss of information. In case of trouble, storage areas may be affected to a higher degree by repeated reading and writing in the adjacent storage areas. Accordingly, this characteristic of a tube is checked by:

(1) Writing a "1" or a "0" in a test area.

(2) Repeatedly reading and writing in nearby storage spots.

(3) Read the test spot and assure that it still indicates the binary state to which it was set under step 1 of this test.

If a barrier grid store fault is present, it will undoubtedly be pinpointed by one of the above-noted tests.

Figure 9:
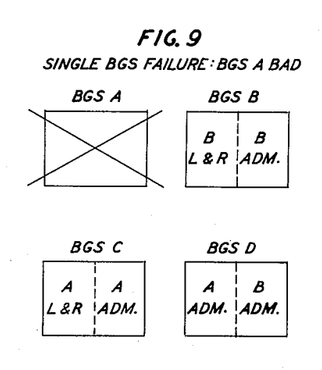
FIG. 9 shows the arrangement of information in the Temporary Memory when one unit of the Temporary Memory is inoperative.

Once a fault has been indicated, steps are undertaken to energize the appropriate one or more of the Trouble Relays 5024 through 5027. For purposes of illustration only, it is assumed that the A barrier grid store 4001 is indicated to be in trouble. The system must then undertake the rearrangement of information in the barrier grid stores to arrive at the arrangements shown in FIG. 9. The changes which must be effected are determined by a comparison of the arrangements of information shown in FIGS. 8 and 9. The C barrier grid store 4003 has both line and register and administration information relating to the A group of lines and the B barrier grid store 4002 has both line and register and administration information relating to the B group of lines. As previously stated, once a trouble condition has been pinpointed, steps are undertaken to preserve the administration information for both groups of lines even at the expense of loss of the duplication of line and register information. In the case of failure of only the A barrier grid store 4001, the B line and register information which is normally stored in the left side of the D tube 4004 is replaced with the A administration information which is copied from the right side of the C tube 4003. That is, the Common Control 110 introduces a program which point by point reads the storage areas on the right side of the C tube 4003 and then writes this information point by point in the left side of the D tube 4004. As seen in FIG. 9, in the single trouble mode of operation, both A and B administrative information is retained in duplicate while both A and B call progress information appears only once.

The trouble lamps 5028 through 5031 are energized in accordance with the settings of the Trouble Relays 5024 through 5027, respectively.

In the case of the trouble of the example, that is, the situation in which the A barrier grid store 4001 is defective, Equations 5 through 9 for both the Input and Output Translators will apply. That is, the A conductor 5001 will be energized and the conductors 5005 through 5008 will be energized in accordance with the nature of the information which is desired by the Common Control 110. It should be noted that in this group of five equations, only, orders seeking B group administration information, permit the matching of outputs from a regular and standby tube. This situation is readily understood by examination of FIG. 9 in which it is seen that only the B administrative information lies in similar addresses of a pair of tubes.

Once a tube has been found to be in trouble and its associated trouble relay energized, a maintenance man must take the necessary remedial steps. Each of the barrier grid store tubes 4001 through 4004, when taken out of service by energization of one of the Trouble Relays 5024 through 5027 may be manually controlled for purposes of clearing trouble. After the maintenance man has cleared the trouble or has completed his routine in the tube in which trouble is suspected, the manual restore key 6013 is energized to set the R flip-flop 6010. As in the case of the alarm scan points 6008 and 6009, the restore scan point 6011 is scanned from time to time under control of the main program sequence. If the R flip-flop 6010 is found to be in its "1" state, a series of program steps are undertaken to return the system from the trouble to the no-trouble mode of operation. Under these conditions, a copying routine must be undertaken to rearrange the information in the tubes from the trouble mode to the no-trouble mode. In the case of the illustrative example in which the A barrier grid store 4001 was in trouble, the following steps are undertaken:

Step 1—The A group line and register and administrative information in the C barrier grid store is copied into the A barrier grid store 4001.

Step 2—The B line and register information in the left half of the B barrier grid store 4002 is read into the left half of the D barrier grid store 4002, thereby eliminating the A administrative information previously stored therein.

The copying routing must be interleaved with normal system activities. Until the copying routine has been completed, information is taken from the Temporary Memory as though the original trouble still existed. In the process of copying, information is read from the memory in accordance with the indicated trouble conditions and this information is read back into the proper barrier grid store in the Restore mode of operation. That is, the program order under which information is copied back into the memory effects setting not only of one of the four flip-flops 5010 through 5013, but in addition, effects setting of the restore flip-flop 5014. As previously indicated, energization of the restore lead 5009 serves to negate the effect of the Trouble Relays 5024 through 5027 with respect to the Input Control Translator 3006. In the Restore mode of operation, the first four equations which define the no-trouble mode of operation apply to the Input Control Translator 3006. After the copying routine has been completed, AND gate 5032 is enabled and the A and B alarm flip-flops 6006 and 6007 are reset. This action overcomes any inadvertent setting of an alarm flip-flop during the copying procedure.

The above description is by way of illustration only and it is to be understood that information can be similarly rearranged in the case of a single barrier grid store failure regardless of the particular tube which is in trouble.

If more than one tube fails, neither the call progress or administration information can be duplicated as the memory capacity under these conditions is just sufficient to meet the system requirements. If a trouble locating routine indicates a failure in more than one tube, the associated Trouble Relays are energized and the Input and Output Control Translator functions in accordance with the tables of equations for the indicated trouble conditions.

It is unlikely that a double trouble mode of operation will not follow a single trouble mode of operation. That is, it is unlikely that two memory devices will fail simultaneously. In transferring from the single trouble mode of operation of FIG. 9 to the double trouble mode of operation of FIG. 10, the line and register information relating to the A group of lines will be lost. This information is recovered, however, when the A group of lines and trunks is scanned; therefore, continuity of system operation is not lost by this loss of information. Only in the case of loss of the A or B administration information, which is of a priority type, will system operation be seriously affected.

Figure 10:
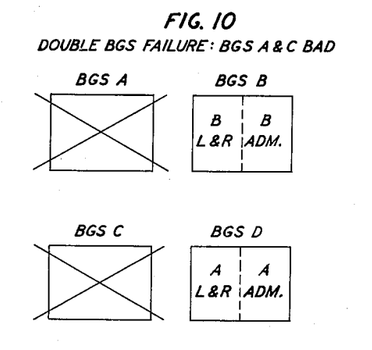
FIG. 10 shows the arrangement of information in the Temporary Memory when two units of the Temporary Memory are inoperative.

Once the maintenance man has cleared the trouble in one tube, a program sequence may be undertaken to transfer the system from the double trouble mode of FIG. 10 or its counterpart to the single trouble mode of FIG. 9 or its counterpart, dependent upon the tube or tubes in which trouble exists.

In this one illustrative example, the Temporary Memory comprises four barrier grid store tubes. The above description is specific to this type of Temporary Memory and number of storage units therein; however, it must be fully understood that this invention is not limited to these arrangements. For example, other types of Temporary Memory having fewer or larger numbers of independent storage elements can be similarly controlled to advantage by the teachings of this invention.

Accordingly, the above description is by way of illustration only and many variations thereof may be devised by one skilled in the art without departing from the spirit and scope of this invention.

What is claimed is:

1. A telephone switching system comprising a plurality of lines, a plurality of trunks, a switching network for interconnecting said lines and trunks, and a control circuit for determining the operation of said switching network and including a permanent memory for storing control program sequences, a temporary memory for storing line information and system administration information, said temporary memory comprising a plurality of memory devices normally arranged as regular and standby temporary memory devices with the information stored in said standby devices normally being identical to the information stored in said regular devices, means for detecting a failure in one of said regular storage devices, means for erasing said line information from another of said standby storage devices and for transferring the administration information from one of said standby storage devices to said another standby storage device on occurrence of failure of said one regular storage device whereby duplication of said administration information is maintained after said failure, and gating means responsive to said program sequences and the information stored in said temporary memory for determining the operation of said control circuit.

2. A telephone switching system comprising a plurality of lines, a plurality of trunks, a switching network for interconnecting said lines and trunks; and a control circuit for determining the operation of said switching network and including a permanent memory for storing control program sequences, a temporary memory for storing line information and system administration information, said temporary memory comprising a plurality of memory devices normally arranged as regular and standby temporary memory devices with the information stored in said regular devices normally being identical to the information stored in said standby devices, means for detecting a failure in one of said storage devices, means for transferring information in and out of said temporary memory units, including means for transferring said administration information from any selected one of said storage devices to any other of said storage devices upon the occurrence of a failure in said one of said storage devices, and gating means responsive to said control program sequences and the information stored in said temporary memory for determining the operation of said control circuit.

3. A telephone switching system comprising a plurality of lines, a plurality of trunks, a switching network for interconnecting said lines and trunks, and a control circuit for determining the operation of said switching network and including a permanent memory for storing control program sequences, a temporary memory for storing line information and system administration information, said temporary memory comprising a plurality of memory devices normally arranged as regular and standby temporary memory devices with the information stored in said standby devices normally being identical to the information stored in said regular devices, each of said memory devices having a plurality of information addresses, means for simultaneously addressing all of said memory devices to the same information address, means for matching the information stored in a particular one of said regular storage devices with the information stored in a particular one of said standby storage devices, means responsive to a mismatch signal from said matching means for controlling said control circuit to initiate a fault finding program sequence to determine which of said particular one of said regular or said standby storage devices is faulty.

4. The combination defined in claim 3 further comprising means for disabling the faulty one of said particular regular or standby storage devices and means for rearranging said information stored in said storage devices to maintain a duplication of said administration information.

5. The combination defined in claim 4 further comprising means for determining when the faulty one of said particular regular or standby storage devices has been corrected, and means controlled by said last named means for rearranging said information stored in said storage device to attain a duplication of all of said line and said system administration information.

6. The combination defined in claim 4 wherein said last named means comprises means for erasing said line information from another of said standby storage devices and for storing therein the administration information stored in said particular one of said regular or standby storage devices which is not faulty.

7. A telephone switching system comprising a plurality of lines, a plurality of trunks, a switching network for interconnecting said lines and trunks, and a control circuit for determining the operation of said switching network, said control circuit including temporary memory means including a plurality of distinct memory stores for the storage of information of at least two levels of importance, said information being normally duplicated in pairs of said distinct memory stores, means for detecting a failure of one of said stores, and means responsive to said failure detection for erasing the lesser importance information from another of said stores and for storing therein the greater level information priorly stored in said one store.

8. A telephone switching system in accordance with claim 7 wherein one of each of said pairs of distinct stores in said memory is normally a regular store and the other of each pair is normally a standby store, said means responsive to failure detection of a regular store of one of said pairs comprising means for erasing the lesser importance information from the standby store of another of said pairs and for storing therein the greater level information from said standby store of said one pair.

9. A telephone switching system in accordance with claim 7 wherein said stores comprise barrier grid tubes.

10. In a telephone switching system, temporary memory means including a plurality of pairs of distinct stores, each of said stores normally containing information of lesser and greater importance and one of each of said pair of stores being normally the regular store and the other of each of said pair of stores being normally the standby store, said information being normally duplicated in the regular and standby stores of each pair, means for detecting a failure in any of said stores comprising means for matching the outputs from the regular and standby stores of each pair, and means responsive to a failure in one store of a given pair for erasing the lesser importance information from a standby store of another pair and for storing therein in its place the greater importance information from said given pair of stores.

11. A telephone switching system comprising a plurality of lines, a plurality of trunks, a switching network for interconnecting said lines and trunks, and a control circuit for determining the operation of said switching network, said control circuit including temporary memory means including a plurality of pairs of distinct stores, each of said stores normally containing information of lesser and greater importance and one of each of said pair of stores being normally the regular store and the other of each of said pair of stores being normally the standby store, said information being normally duplicated in the regular and standby stores of each pair, means for detecting a failure in any of said stores, means responsive to a failure in one store of a given pair for erasing the lesser importance information from a standby store of another pair and for storing therein in its place the greater importance information from said given pair of stores, means for determining the normal mode of operation of said temporary memory means, and means responsive to said failure detection for determining a trouble mode of operation of said temporary memory means.

12. A telephone switching system in accordance with claim 11 wherein said means for detecting a failure in any of said stores comprises means for matching the outputs from the regular and standby stores of each pair during normal mode of operation of said temporary memory means, said means for determining a trouble mode of operation including means for preventing operation of said matching means with respect to said information in said standby store of said given pair.

13. The combination defined in claim 11 further comprising means for determining when the faulty one of said stores has been corrected, and means controlled by said last named means for returning to the normal mode of operation of said temporary memory means.

References Cited in the file of this patent

UNITED STATES PATENTS 2,723,311    Malthaner _______________ Nov. 8, 1955